United States Patent
Kim et al.

(10) Patent No.: US 10,344,996 B2
(45) Date of Patent: Jul. 9, 2019

(54) METHOD AND APPARATUS FOR CONTROLLING ENERGY IN HVAC SYSTEM

(71) Applicant: SAMSUNG ELECTRONICS CO., LTD., Suwon-si (KR)

(72) Inventors: Kyung-Jae Kim, Suwon-si (KR); Yong-oh Lee, Seoul (KR); Hyun-suk Min, Suwon-si (KR); Sang-sun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 14/679,167

(22) Filed: Apr. 6, 2015

(65) Prior Publication Data
US 2015/0285527 A1    Oct. 8, 2015

(30) Foreign Application Priority Data

Apr. 4, 2014    (KR) .................. 10-2014-0040357

(51) Int. Cl.
*F24F 11/00*    (2018.01)
*F24F 11/30*    (2018.01)
(Continued)

(52) U.S. Cl.
CPC .............. *F24F 11/30* (2018.01); *F24F 11/62* (2018.01); *F24F 11/64* (2018.01); *F24F 11/65* (2018.01);
(Continued)

(58) Field of Classification Search
CPC ................. F24F 11/0012; F24F 11/006; F24F 2011/0075; G05B 15/02; G05B 2219/2642; G06N 7/005
See application file for complete search history.

(56) References Cited

U.S. PATENT DOCUMENTS

2007/0045431 A1*  3/2007  Chapman, Jr. ....... F24F 11/0012
                                            236/46 C
2008/0083234 A1   4/2008  Krebs et al.
(Continued)

FOREIGN PATENT DOCUMENTS

CN     102639942 A    8/2012
EP       2476967 A1   7/2012
(Continued)

OTHER PUBLICATIONS

Search Report dated Jul. 13, 2015 issued by the International Searching Authority in counterpart International Application No. PCT/KR2015/003430 (PCT/ISA/210).
(Continued)

*Primary Examiner* — Ryan A Jarrett
(74) *Attorney, Agent, or Firm* — Sughrue Mion, PLLC

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. method for controlling energy in a Heating, Ventilation, and Air Conditioning (HVAC) system includes determining whether a user is absent in a use space for energy control; if the user is absent, determining whether to initiate energy control by using a user's departure and arrival probability and a probability distribution of a length of time away, which are determined based on previously stored data.

18 Claims, 5 Drawing Sheets

(51) Int. Cl.
    *F24F 11/62*      (2018.01)
    *G05B 15/02*      (2006.01)
    *G06N 7/00*      (2006.01)
    *F24F 11/64*      (2018.01)
    *F24F 11/65*      (2018.01)
    *F24F 110/10*      (2018.01)
    *F24F 11/46*      (2018.01)
    *F24F 120/10*      (2018.01)

(52) U.S. Cl.
    CPC .............. *G05B 15/02* (2013.01); *G06N 7/005* (2013.01); *F24F 11/46* (2018.01); *F24F 2110/10* (2018.01); *F24F 2120/10* (2018.01); *G05B 2219/2642* (2013.01)

(56) References Cited

U.S. PATENT DOCUMENTS

| | | |
|---|---|---|
| 2008/0083834 A1 | 4/2008 | Krebs et al. |
| 2008/0099570 A1 | 5/2008 | Krebs et al. |
| 2010/0025483 A1* | 2/2010 | Hoeynck ................ F24F 11/001 236/1 C |
| 2012/0066168 A1* | 3/2012 | Fadell .................... G05B 15/02 706/52 |
| 2012/0247748 A1 | 10/2012 | Mise et al. |
| 2014/0101082 A1* | 4/2014 | Matsuoka ........... H04L 12/2829 706/12 |

FOREIGN PATENT DOCUMENTS

| | | |
|---|---|---|
| JP | 7-158927 A | 6/1995 |
| JP | 11-14119 A | 1/1999 |
| JP | 2013-190164 A | 9/2013 |
| JP | 2013-200098 A | 10/2013 |
| KR | 10-0844338 B1 | 7/2008 |
| WO | 2014/051632 A1 | 4/2014 |

OTHER PUBLICATIONS

Written Opinion dated Jul. 13, 2015 issued by the International Searching Authority in counterpart International Application No. PCT/KR2015/003430 (PCT/ISA/237).

Communication dated Feb. 6, 2018, issued by the European Patent Office in counterpart European Application No. 15772721.5.

Communication dated Sep. 5, 2018, issued by the State Intellectual Property Office of P.R. China in counterpart Chinese Application No. 201580018109.0.

\* cited by examiner

METHOD AND APPARATUS FOR CONTROLLING ENERGY IN HVAC SYSTEM

CROSS-REFERENCE TO RELATED APPLICATION

This application claims priority from Korean patent application filed in the Korean Intellectual Property Office on Apr. 4, 2014 and assigned Serial No. 10-2014-0040357, the entire disclosure of which is incorporated herein by reference.

BACKGROUND

1. Field

Apparatuses and methods consistent with exemplary embodiments relate to controlling energy in a Heating, Ventilation, and Air Conditioning (HVAC) system to efficiently save the energy in a building management system.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In general, buildings such as hotels may have an energy control system for effectively controlling the energy. The energy control system may perform occupancy detection (or determine whether a user is present in the room) using a door lock or a motion sensor, and if it is determined that the user is absent from the room, the energy control system may perform setback control based on the results. The term 'setback control' as used herein may refer to a control method for temporarily changing the set temperature in order to save energy in a low-energy use time such as night time. The setback control method may immediately start the control upon detecting the absence of the user, or it may wait to start the control until the absence of the user has lasted for a predetermined time after the absence of the user was detected. In the former case, if the user has come back to the room after going out for a short while, the energy consumption may be higher, compared with when the user has stayed in the room. The reason is that when the user has come back to the room quickly, more energy consumption is required compared to the usual because of the instantaneous temperature control. In the latter case, additional energy consumption might occur for the predetermined time before the setback control is initiated after the absence of the user.

In the case of static setback control in which a fixed value is used, when the user has come back to the room from going out, the time required to return the temperature of the room back to the normal temperature may take long, so it may not be possible to provide comfort to the user during that time. Thus, even if the going out time of the user is quite long, it may be inappropriate to turn off the power for energy saving. In addition, it is possible to determine the temperature that can be changed within a predetermined time, for each device, taking into account the degree of aging of devices, and perform dynamic setback control based on the determined temperature. However, since this method does not consider the user's comeback time, its energy efficiency may not be high, and even this method may not provide comfort to the user at the user's comeback time, like the static setback control. Further, even the method of detecting the occupancy (or the presence of the user) using the door lock or the motion sensor is not enough to cover all of the various situations, such as a situation where the motion sensor has a blind spot or a situation where there are multiple users.

The above information is presented as background information only to assist with an understanding of the present disclosure. No determination has been made, and no assertion is made, as to whether any of the above might be applicable as prior art with regard to the present disclosure.

SUMMARY

Aspects of one or more exemplary embodiments address at least one or more of the above-mentioned problems and/or disadvantages and provide at least some advantages described below. Accordingly, an aspect of an exemplary embodiment provides a method and apparatus for performing energy control and increasing accuracy of occupancy detection by using devices and sensors connected over a network within a use space.

Another aspect of an exemplary embodiment provides a method and apparatus for analyzing an occupancy pattern corresponding to a user's characteristics and performing energy control based on the occupancy pattern.

According to an aspect of an exemplary embodiment, there is provided a method for controlling energy in a climate control system, the method including determining whether a user is absent in a use space for energy control; in response to the user being absent, determining whether to initiate energy control by using a departure probability of the user, an arrival probability of the user, and a probability distribution of a length of time away, which are determined based on previously collected and stored data; in response to determining to initiate energy control, determining a departure probability for each of a plurality of time intervals and determining a probability distribution for a length of time away for each time interval, based on the previously collected and stored data; selecting a target time interval for performing energy control based on an arrival probability of the user that is calculated based on the determined probability distribution, and calculating a target temperature for the selected target time interval; and setting a reservation to perform energy control according to the selected time interval and the calculated target temperature.

The determining the probability distribution may include: collecting information about the user and collecting information about a surrounding environment of the use space; collecting departure pattern information and arrival pattern information of a user group including users having similar characteristics to the characteristics of the user, based on the collected information; and determining the departure probability for each time interval and the probability distribution for a length of time away that has occurred for each time interval, based on the collected pattern information.

The climate control system may be a Heating, Ventilation, and Air Conditioning (HVAC) system, and the calculating the target temperature may include: determining a desired temperature of a user group including users having similar characteristics to the characteristics of the user, and determining a room temperature that is maintained when power of the HVAC system is turned off; selecting a time interval in which the calculated user arrival probability is higher than or equal to a predetermined threshold and energy control is to be performed; and calculating the target temperature for the selected time interval based on the desired temperature and the room temperature.

The climate control system may be a Heating, Ventilation, and Air Conditioning (HVAC) system, and the setting the reservation may include: calculating a preheat time required for energy control based on characteristics of the HVAC system; determining operation reservation information for the HVAC system; and setting the reservation based on the calculated preheat time and the determined operation reservation information.

The determining whether the user is absent may include determining whether the user is absent based on at least one of a state of a door lock, data that is output from at least one sensor, and a current state of at least one device that is located in the use space and connected to a network or a gateway.

The previously collected and stored data may include user data, environmental data, building data, and energy control system data. The user data may include at least one of sex of the user, age of the user, purpose of travel, travel period, number of companions, and ages of the companions. The environmental data may include at least one of date, day and weather. The building data may include at least one of characteristics of an area where the building is located, information about a periphery of the building, data related to an event in the vicinity of the building, and a past or current user-specific occupancy pattern of the building. The energy control system data may include data related to previous energy control execution.

The climate control system may be a Heating, Ventilation, and Air Conditioning (HVAC) system, and the determining whether to initiate energy control may include initiating the energy control if the length of going out is expected to exceed a minimum time for which power of the HVAC system should be kept turned on in the absence of the user.

The climate control system may be a Heating, Ventilation, and Air Conditioning (HVAC) system, and the minimum time may be the time in which energy consumption per unit time while the power of the HVAC system is turned on exceeds energy consumption per unit time for returning a room temperature to a previous temperature when the power of the HVAC system is turned on back after being turned off.

The method may further include, upon determining to initiate energy control, determining whether pre-reserved information is present for energy control, and in response to the pre-reserved information being present, setting the reservation for performing energy control based on the pre-reserved information.

The method may further include calculating an amount of energy consumed that is based on scheduling information of the set reservation, and calculating the amount of energy consumed that occurs when a room temperature of the use space is maintained constant; and storing the calculated information to use the stored information for future energy control.

According to an aspect of another exemplary embodiment, there is provided an apparatus for controlling energy in a climate control system, including a storage configured to store user-related information and building-related information; a temperature sensor configured to detect a room temperature of a use space for energy control; and a temperature controller configured to: in response to the user being absent, determine whether to initiate energy control by using a departure probability of the user, an arrival probability of the user, and a probability distribution of a length of time away, which are determined based on data that is previously collected and stored in the storage; in response to determining to initiate energy control, determine a departure probability for each of a plurality of time intervals and a probability distribution for a length of time away for each time interval, based on the previously collected and stored data; select a target time interval for performing energy control based on a user arrival probability that is calculated based on the determined probability distribution, and calculate a target temperature for the selected target time interval; and set a reservation to perform energy control according to the selected target time interval and the calculated target temperature.

The temperature controller may be configured to: collect information about the user and information about a surrounding environment of the use space; collect departure pattern information and arrival pattern information of a user group including users having similar characteristics to the characteristics of the user, based on the collected information; and determine the departure probability for each time interval and the probability distribution for a length of time away that has occurred for each time interval, based on the collected pattern information.

The climate control system may be a Heating, Ventilation, and Air Conditioning (HVAC) system, and the temperature controller may be configured to: determine a desired temperature of a user group including users having similar characteristics to the characteristics of the user, and determine a room temperature that is maintained when power of the HVAC system is turned off; select a time interval in which the calculated user arrival probability is higher than or equal to a predetermined threshold and energy control is to be performed; and calculate the target temperature for the selected time interval based on the desired temperature and the room temperature.

The climate control system may be a Heating, Ventilation, and Air Conditioning (HVAC) system, and the temperature controller may be configured to: calculate a preheat time required for energy control based on characteristics of the HVAC system; determine operation reservation information for the HVAC system; and set the reservation based on the calculated preheat time and the determined operation reservation information.

The temperature sensing unit may be configured to determine whether the user is absent based on at least one of a state of a door lock, data that is output from at least one sensor, and a current state of at least one device that is located in the use space and connected to a network or a gateway.

The previously collected and stored data may include user data, environmental data, building data, and energy control system data, the user data may include at least one of sex of the user, age of the user, purpose of travel, travel period, a number of companions, and ages of the companions, the environmental data may include at least one of date, day and weather, the building data may include at least one of characteristics of an area where the building is located, information about a periphery of the building, data related to an event in the vicinity of the building, and a past or current user-specific occupancy pattern of the building, and the energy control system data may include data related to previous energy control execution.

The climate control system may be a Heating, Ventilation, and Air Conditioning (HVAC) system, and the temperature controller may be configured to initiate the energy control if the length of going out is expected to exceed a minimum time for which power of the HVAC system should be kept turned on in the absence of the user.

The climate control system may be a Heating, Ventilation, and Air Conditioning (HVAC) system, and the minimum time may be the time in which energy consumption per unit time while the power of the HVAC system is turned on exceeds energy consumption per unit time for returning a room temperature to a previous temperature when the power of the HVAC system is turned on back after being turned off.

The temperature controller may be configured to, upon determining to initiate energy control, determine whether pre-reserved information is present for energy control, and in response to the pre-reserved information being present, set a reservation for performing energy control based on the pre-reserved information.

The temperature controller may be configured to calculate an amount of energy consumed that is based on scheduling information of the set reservation, and calculate the amount of energy consumed that occurs when a room temperature of the use space is maintained constant; and store the calculated information to use the stored information for future energy control.

According to an aspect of another exemplary embodiment, there is provided a method of controlling a temperature of a room, the method including determining whether a user is present in the room; and in response to the user being not present in the room for a period of time, initiating a temperature control sequence, and the temperature control sequence includes: determining a probability of the user arrival within a time interval; adjusting a temperature of the room according to the determined probability.

The determining whether the user is present in the room may include at least one of detecting a card key in a lock and detecting motion using a motion sensor.

The determining the probability of the user arrival within a time interval may include: collecting information about the departure habits of the user and arrival habits of the user; determining the probability of the user arriving in each of a plurality of time intervals based on the departure habits of the user and arrival habits of the user; and determining the probability of the user arriving in a current time interval by comparing the current time interval to each of the plurality of time intervals.

Other aspects, advantages, and salient features of the disclosure will become apparent to those skilled in the art from the following detailed description, which, taken in conjunction with the drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
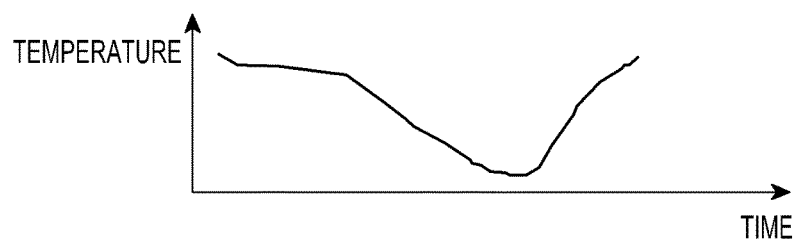
FIGS. 1A and 1B illustrate temperature change and energy consumption in accordance with an on/off operation of a heating appliance according to an exemplary embodiment.
Figure 1A:
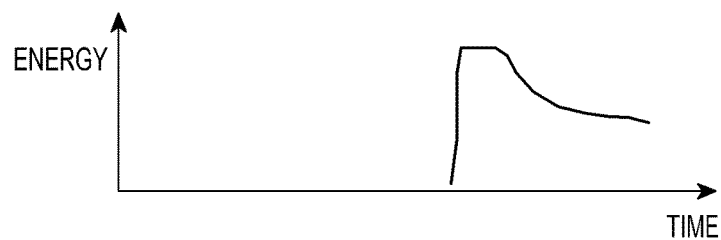

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the dictionary meanings, but, are merely used by the inventor to enable a clear and consistent understanding of the disclosure. Accordingly, it should be apparent to those skilled in the art that the following description of exemplary embodiments is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Expressions such as "at least one of," when preceding a list of elements, modify the entire list of elements and do not modify the individual elements of the list.

one or more exemplary embodiments that provide a method for determining a user occupancy (or determine whether the user is present in the room) using the states of multiple devices and sensors that are connected to and controlled/monitored by a Gateway (GW) or a device (e.g., a cellular phone, a TV, an air conditioner, a Set-Top Box (STB), a refrigerator, a robot cleaner, a tablet Personal Computer (PC), a desktop PC, and/or the like) serving as the GW, for effective and efficient control of a climate such as Heating, Ventilation, and Air Conditioning (HVAC) during the absence of the user in a specific space, and an energy saving method designed for the comfort of the user and based on a pattern of the user occupancy. The climate control is a method to provide thermal comfort and acceptable indoor air quality such as a temperature, a humidity, fine dust concentration, and so on.

For energy control according to an exemplary embodiment, a user's departure times, arrival times, and a length of time spent away may be stored in a server or a gateway during a predetermined period. In addition, the date, day, time zone, temperature, humidity, amount of sunlight, supplied energy, room temperature, and the control history of the HVAC system may be stored in the server or gateway. Further, data about a number of guests, a gender of the guests, a temperature of rooms, and an HVAC control state may be collected from the system that manages buildings (e.g., hotels, which are the subject of energy control) and the collected data may be reflected in energy control algorithms. Also, data relating to information about a periphery of the buildings may be collected and reflected in energy control.

In the following description, an energy control method according to an embodiment of the present disclosure will be divided into four methods: an occupancy detection method, a data collection and processing method for analyzing a user's departure/arrival pattern, a pattern-based setback method, and a setback control method based on a user's arrival probability. In addition, the term 'energy control' will be used interchangeably with 'setback control'.

First, the occupancy detection method for setback control according to an exemplary embodiment will be described.

For more accurate occupancy detection, according to an exemplary embodiment, it is possible to determine occupancy by connecting devices or sensors in a use space to a network or a gateway, and reflecting the states (e.g., a power on/off state, a connection state of the network such as Wireless Local Area Network (WLAN), and/or the like) of the devices. By utilizing this information, it is possible to improve the reliability of the occupancy detection result, compared with a conventional method of determining occupancy using only a door lock or a motion sensor.

In an exemplary embodiment, the occupancy may be determined (i.e., it may be determined that a user is present in the room) according to at least one of the following: (1) if a card key is plugged in (or inserted), (2) if motion sensing or device control has occurred, (3) if a state of the door lock is changed while in the absence state, and then sensing has been done by the sensor or control has occurred in the devices connected over the network, and (4) if the user's cellular phone, tablet PC, or laptop computer is connected to the WLAN to access a service.

In addition, in an exemplary embodiment, it may be determined that a user is absent from the room according to at least one of the following: (1) if a card key is not plugged in, (2) if a state of the door lock is changed while in the occupancy state, and then sensing has not been done by the sensor and control has not occurred in the devices connected over the network for a predetermined time, and (3) if the user's cellular phone, tablet PC or laptop computer is connected to the WLAN to access a service in a space other than the space where energy control is performed.

The devices connected over the network may include an air conditioner, a refrigerator, an audio set, lighting devices, a stand lamp, a hair dryer, a coffee pot and the like, and other devices may also be connected over the network. The sensors may include a motion sensor, a contact sensor, a magnetic sensor, etc.

It may be determined that a user is present in or absent from a room according to a predetermined number of conditions being satisfied through a combination of one or more of the above conditions.

Next, a data collection and processing method for recognition of a space user occupancy pattern according to an exemplary embodiment will be described.

To efficiently control the energy, it is necessary to predict a user's departure and arrival times. To this end, in an exemplary embodiment, information about a periphery of the buildings or the space use patterns of other users may be identified in order to determine the space user occupancy pattern.

In order to determine a user's occupancy pattern, it is possible to collect user data (e.g., sex, age, purpose of travel, and/or the like), environmental data (e.g., date, day, weather and/or the like), and the departure/arrival time data.

The collected data may be separated by the types of user data and environmental data, and the separated data may be stored again in units of the time interval. Based on the data that is stored in units of the time interval, a departure probability may be calculated and stored, a distribution of the time until arrival after departing may be stored, and a distribution for a probability that the user will go out and a length of the time spent away may be stored.

In addition, it is possible to estimate the occupancy time in which the domain characteristics of the building are utilized. In other words, it is possible to estimate the occupancy time of the user having similar characteristics, based on the period for which an event is occurring if an event is scheduled in an area where the building is located, based on the characteristics of the area (e.g., a tourist area, an office area, and/or the like) where the building is located, and based on the past or current user-specific occupancy pattern. If such data is accumulated to some extent, it is possible to set and use an initial value for each occupancy pattern. In addition, it is possible to improve the prediction accuracy of the occupancy time based on the Point Of Interest (POI) information about the periphery of the building. For example, it is possible to predict the user's occupancy time by collecting the characteristics of the area where the building is located, and the opening and closing times of major facilities such as restaurants, attractions, shopping centers, play facilities and event venues, which are located in a vicinity of the building. In addition, if many people are staying in one room, or are accompanied by children, they may be highly likely to be guests on vacation, and if a person is staying alone in a room, the person may be highly likely to be a business guest. By combining these characteristics, it is possible to determine the occupancy pattern.

For example, in the period for which International Consumer Electronics Show (CES) is held, it is generally known that most of the room users will go out during the fair opening hours, and will come back to the room after the fair ends. In addition, the guest's occupancy pattern may vary depending on the characteristics of the area where the building is located. In Las Vegas, users mainly use the casino facilities at night. Thus, in many cases, the users may not come back to the room until late night hours if they go out in the evening. In San Jose, there are many guests on business trips. Thus, in many cases, the users may not come back until dinner if they go out after breakfast. In addition, in Hawaii, the users are mainly tourists, so they are mainly going out in the daytime.

Next, a method of performing setback control based on the user pattern according to an exemplary embodiment will be described.

In an exemplary embodiment, it is possible to perform setback control by calculating a length of the time interval actually required for energy saving through an analysis of energy consumption corresponding to a temperature change, and combining the length with the user space absence pattern.

Figure 1B:
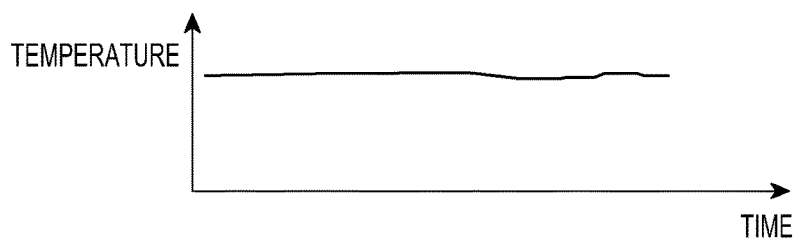
Figure 1B:
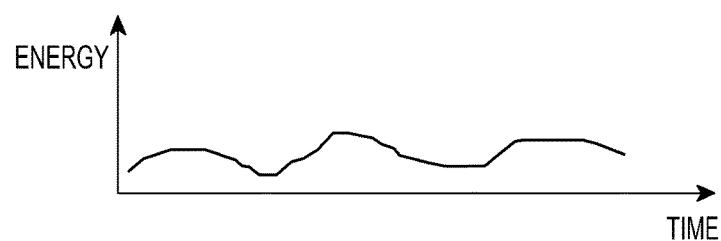

FIGS. 1A and 1B illustrate temperature change and energy consumption in accordance with an on/off operation of a heating appliance.

FIG. 1A illustrates temperature change and energy consumption when the power of the heating appliance is turned back on after being turned off for a period of time, and FIG. 1B illustrates temperature change and energy consumption when the power of the heating appliance is kept on without being turned off. Using the energy consumption graphs in FIGS. 1A and 1B, it is possible to find the time T at which the energy consumption occurring when the power is kept turned on exceeds the energy consumption occurring when the power is turned back on after being turned off for a period of time. Therefore, it is possible to save energy by performing setback control using the time T.

First, a method of calculating a length of a time interval T required for energy saving will be described.

Any or all of the aging degree, the heat transfer rate, the use efficiency, the energy consumption and the function may be different depending on the HVAC system. Therefore, in an exemplary embodiment, a minimum time length required for energy saving may be determined for each HVAC system. The determined minimum time length may be stored in a server or a gateway. For example, in the case of heating, the time T at which the energy (=A) required for keeping the temperature constant exceeds the energy (=B) required for increasing the temperature back after decreasing the temperature (i.e., A>B) may be stored. The time T may be determined using the time-dependent temperature change that occurs when the power of the HVAC system is turned off, the time-dependent temperature change that occurs when the power is turned on, and the energy consumption.

For example, assuming that the current temperature is 23° C. and energy of 60 kilowatts is consumed to keep the temperature of 23° C. for one hour, energy consumption per minute is 1. In this case, if the power of the heating appliance is turned off, the room temperature may drop to 19° C. and the dropped room temperature may be kept. In other words, $Temp_{min}=19°$ C. In addition, if the power of the heating appliance is turned off, it may take 20 minutes for the room temperature to decrease from 23° C. to 19° C., and in this case, temperature reduction per minute is 0.2. In addition, assuming that it takes 10 minutes to increase the room temperature from 19° C. to 23° C. by turning back on the power of the heating appliance, and an energy of 80 kilowatts is consumed, temperature increase per minute is 0.4 and energy consumption per minute is 8. Therefore, If T is longer than 80 minutes, energy saving is possible.

In this way, the system manager may determine how much time is necessary in order to save energy, through the control history.

More specifically, temperature change per energy that is consumed by each HVAC system may be stored in a server or a GW. Depending on the aging degree of the devices, even if the energy consumed by two devices is the same, the temperature that a device can change may differ. Values of the temperature change/energy consumption per hour/outside temperature may also be stored in the server or the GW. If such information is stored in the server, the server may calculate and control a preheat/precooling start time of the HVAC system according to the guest arrival time. In addition, in a case where such information is stored in the GW, if the server provides the GW with information about the remaining time until the guest arrival time, the GW may calculate a preheat/precooling start time in consideration of the performance of the HVAC system, and control the HVAC system according to the calculated time.

Next, a method of initiating setback control will be described.

In an exemplary embodiment, setback control may be initiated using the user's departure/arrival occurrence probability and the probability distribution of a length of time away. The probability distribution for a length of time away that has occurred per each time interval may be obtained through analysis of the user's departure/arrival pattern, and energy control may be performed using the probability 'a' that the length of time away that has occurred in the time interval will be longer than the time T required for energy saving.

If an average length of time away of one time interval is denoted as E(L_i), setback temperature control may be started, when a>p_t. Here, p_t is determined by Equation (1) below.

$$p\_t = Us/(Us+Uw) \qquad (1)$$

where Us denotes average energy consumption per unit time when the temperature is maintained during E(L_i), and Uw denotes average energy consumption per unit time when the temperature returns to the original temperature as the power is turned on after the power has been turned off during E(L_i).

'p_t' may be multiplied by a constant and denoted as α·p_t in consideration of the surrounding environment or conditions, in which 'α' is a constant that may be defined by the user and may have a value of 0≤α≤1/a. If α·p_t is set larger, the probability that the proper temperature can be maintained at a particular time may be higher, and an energy saving rate may be lower. On the contrary, if α·p_t is set smaller, the probability that the proper temperature can be maintained at a particular time may be lower, and an energy saving rate may be higher. For example, in a 5-star hotel, the top priority of which is the user satisfaction, α·p_t may be set to 0.8 (α·p_t=0.8) in order to increase the probability for maintaining the proper temperature, and in a 2-star hotel, in which energy saving is important, α·p_t may be set to 0.4 (α·p_t=0.4) in order to increase the energy saving rate.

Next, a user arrival pattern-based dynamic setback control method according to an exemplary embodiment will be described.

In an exemplary embodiment, setback may be controlled based on the user arrival time pattern during the user's absence period, in order to save energy. It is preferable for the setback control to be performed within a range that the user can feel comfortable when the user has arrived at the room.

First, various methods may be used to predict a user's arrival time. For example, if a user's current location is identified due to the user's access to an external network, the user's arrival time may be predicted based on the distance from the user's current location to the location of the building. In addition, it is also possible to predict the user's arrival time by utilizing the user's arrival probability per each time interval or the distribution for a length of time away based on the time interval in which the departure has occurred.

In addition, in the general temperature control, except for a case where the temperature is abruptly raised, an adjustable temperature range per hour of the HVAC system may be determined based on the energy consumption, and used for setback control. The adjustable temperature range per hour may be different depending on the aging degree, heat transfer rate, use efficiency and function of the HVAC system. Therefore, each HVAC system may calculate how much the HVAC system can adjust the temperature during t minutes by collecting and processing temperature adjustment-related data, and then store the calculated value in a server or a GW, to utilize the stored value for setback control.

A method of performing setback control according to an exemplary embodiment is as follows.

First, by controlling the temperature with a value close to the occupancy temperature in an interval where the user's arrival probability is high, and maintaining the room temperature at the occupancy temperature in a particular time interval if the arrival probability is high in the particular time interval, it is possible to allow the temperature to reach the proper temperature without drastic energy consumption. It is possible to determine the heating/cooling or ventilation depending on the season, and compare the room temperature $Temp_{min}$ given when the power of a temperature controller is turned off, with the occupancy temperature, to set a target temperature of setback control. In other words, it is possible to set the target temperature to the value obtained by multiplying a difference between the occupancy temperature and $Temp_{min}$ by the user's homecoming probability. In addition, it is possible to receive a user's requirements and reflect the received user's requirements in setback control.

As an example, if the temperature at which a user feels comfortable is 21° C., with a $Temp_{min}$=18° C., and the probability that the user will come back to the room in an i-th time interval is 0.74, then the temperature that is set in the time interval may be 21−{|21−18|×(1−0.74)}=20.22° C. In addition, if the temperature $Temp_{min}$ given when the power of the heating appliance is turned off is 18° C. ($Temp_{min}$=18° C.), the occupancy temperature is 23° C., and the user's arrival probability is 0.65, then the target temperature of setback control may be 23−{|23−18|×(1−0.65)}=21.25° C. If the arrival probability exceeds a reference value, it is possible to adjust the target temperature to the occupancy temperature using a predetermined threshold, and if the arrival probability is lower than or equal to a reference value, it is possible to perform setback control for turning off the power, using a predetermined threshold.

A method of performing setback control according to another exemplary embodiment is as follows.

First, by controlling the temperature with a value close to the occupancy temperature in an interval where the user's arrival probability is high, and maintaining the room temperature at a value close to the occupancy temperature in a particular time interval if the arrival probability is high in the particular time interval, it is possible to allow the temperature to reach the proper temperature within a predetermined time (e.g., t minutes) without drastic energy consumption. It is possible to determine the heating/cooling depending on the season, and compare the room temperature $Temp_{min}$ given when the power of the temperature controller is turned off, with the occupancy temperature, to set a target temperature of setback control. In other words, it is possible to set the target temperature to the value obtained by multiplying a difference between the occupancy temperature and the temperature that can reach the proper temperature within t minutes, by the user's homecoming probability. In addition, it is possible to receive the user's requirements and reflect the received user's requirements in setback control.

As a specific example, if the temperature at which the user feels comfortable is 21° C., the temperature that can reach the proper temperature within t minutes with the general energy consumption is 5° C., and the probability that the user will come back to the room in an i-th time interval is 0.74, then the target temperature of setback control in the time interval may be 21−(5×0.74)=17.3° C. In addition, if the temperature $Temp_{min}$ given when the power of the heating appliance is turned off is 18° C. ($Temp_{min}$=18° C.), the occupancy temperature is 23° C., the temperature that can reach the proper temperature during t minutes is 5° C., and the arrival probability is 0.74, then the target temperature of setback control in the time interval may be 23−{5×(1−0.74)}=max($Temp_{min}$, 21.7)=21.7° C. If the arrival probability exceeds a reference value, it is possible to adjust the target temperature to the occupancy temperature using a predetermined threshold, and if the arrival probability is lower than or equal to a reference value, it is possible to perform setback control for turning off the power, using a predetermined threshold. In addition, by adjusting the time t, it is possible to adjust the time that the room temperature can reach the occupancy temperature when the user arrives at the room.

Figure 2:
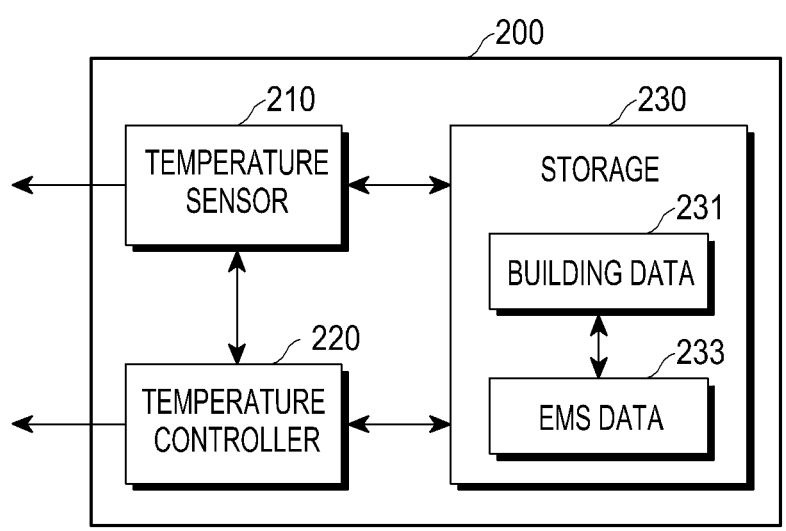
FIG. 2 illustrates a configuration of a system for performing setback control according to an exemplary embodiment.

FIG. 2 schematically illustrates a configuration of a system for performing setback control according to an exemplary embodiment.

Referring to FIG. 2, a setback control system 200 according to an exemplary embodiment may include a temperature sensing unit 210, a temperature controller 220, and a storage unit 230. The storage unit 230 may store user data (e.g., user's sex, age, purpose of travel, and/or the like), environmental data (e.g., date, day, weather and/or the like), building data 231 (e.g., going-out/homecoming time data, user preferred temperature, surrounding environment-related data and/or the like), and Energy Management System (EMS) data 233 that includes a time interval that is set for month/date/day/time for the building, temperature value that is set for each time interval, operation reservation information of the setback control system, and energy usage information. The building data 231 may be connected to the web, internet, server, hotel information system and/or the like to store guest information, local event information, nearby POI information and/or the like.

The temperature sensing unit 210 may detect the room temperature using a temperature sensor, and the temperature controller 220 may control the room temperature through the setback control method according to an exemplary embodiment. The storage unit 230 may separately store the data for setback control as the building data 231 and the EMS data 233 in accordance with a data collection and storage method according to an exemplary embodiment.

Figure 3:
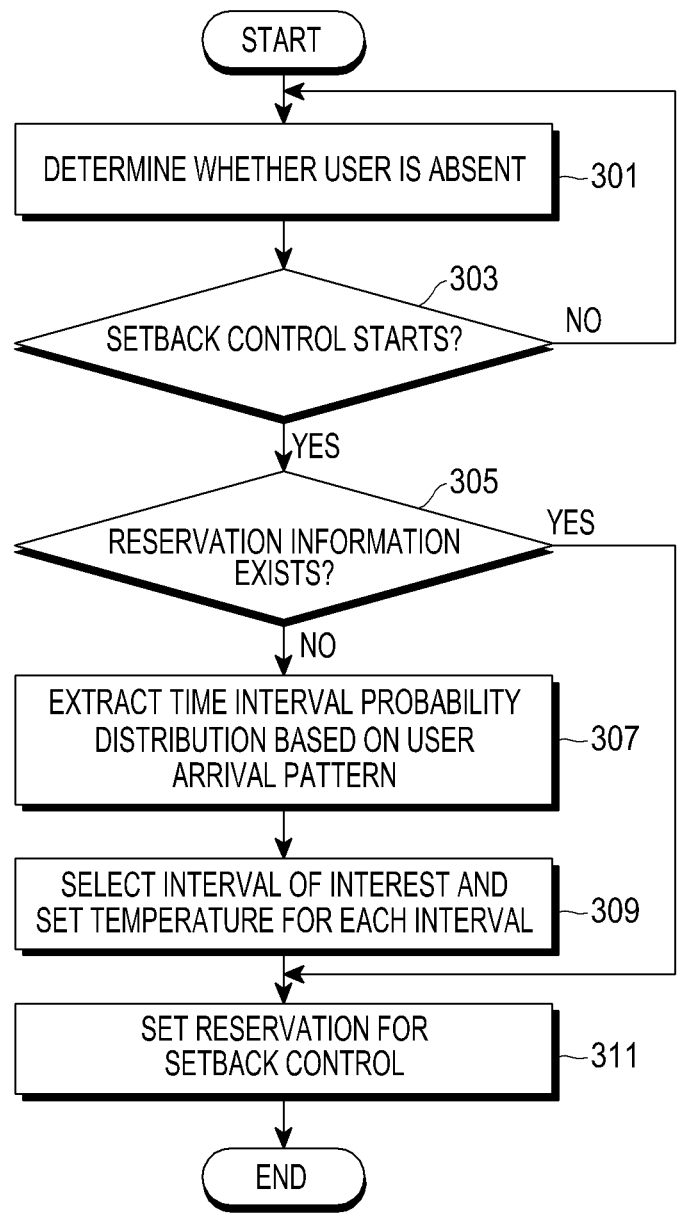
FIG. 3 illustrates a setback control process according to an exemplary embodiment.

FIG. 3 illustrates a setback control process according to an exemplary embodiment.

Referring to FIG. 3, the setback control system 200 may determine whether the user is absent (e.g., by using a door lock or a motion sensor) in operation 301, and determine in operation 303 whether to start setback control, in the absence of the user. In other words, by utilizing the user's departure/arrival occurrence probability and the probability distribution of the length of time away, which are calculated based on the user data (e.g., sex, age, purpose of travel, and/or the like), the environmental data (e.g., date, day, weather and/or the like), the departure/arrival time data and the building's domain characteristics, the setback control system 200 may determine to start the setback temperature control if a>p_t. Upon determining to start the setback control, the setback control system 200 may determine in operation 305 whether there is operation reservation information for the setback control system 200, and if pre-reserved information is present, the setback control system 200 may set a reservation for setback control depending on the pre-reserved information in operation 311. If the pre-reserved information is not present, the setback control system 200 may determine the departure occurrence probability per each time interval and the probability distribution for a length of time away that has occurred per each time interval, based on the data stored in the storage unit 230 in operation 307, and may select a time interval in which the user arrival probability is higher than or equal to a predetermined value (c %), depending on the determined probability distribution, and calculate a target temperature for the selected time interval, in operation 309. For example, if c=5%, the setback control system 200 may perform setback control only for the interval in which the user arrival probability is higher than or equal to 5%. If c=0, the setback control system 200 may perform setback control for all the time intervals. If c=100%, the setback control system 200 might not perform setback control for any of the time intervals. In other words, if the user comes back to the room while the setback control system 200 keeps turning off the power of the heating/cooling appliance until the user comes back to the room, the setback control system 200 may start the temperature control by turning on the power of the heating/cooling appliance. The target temperature may be set based on the proper temperature for the users having similar characteristics, using the building data. In addition, the setback control system 200 may calculate an operation time of the heating/cooling appliance for setback control based on the current temperature, the schedule information, the selected time interval and the interval-specific target temperature. The setback control system 200 may calculate the operation time by reflecting the heat transfer delay time. In operation 311, the setback control system 200 may set a reservation for setback control depending on the calculated value.

Figure 4:
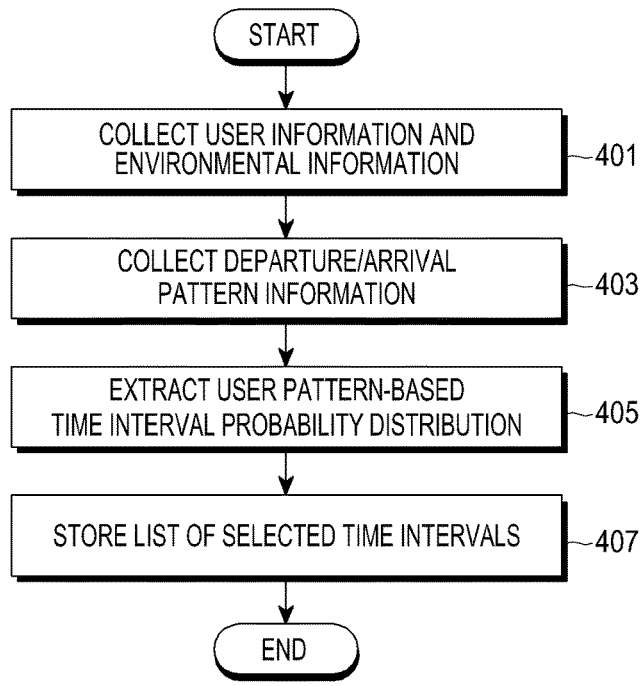
FIG. 4 illustrates a process of determining a user pattern-based time interval probability distribution for setback control according to an exemplary embodiment.

FIG. 4 illustrates a process of determining a user pattern-based time interval probability distribution for setback control according to an exemplary embodiment.

Referring to FIG. 4, the setback control system 200 may collect user information and environmental information in operation 401, and collect departure/arrival pattern information based on the building information in operation 403. In operation 405, based on the collected information, the setback control system 200 may determine the time interval-specific departure/arrival probability distribution and the probability distribution for the time interval-specific length of time away, and select a time interval for performing setback control based on the setback control method according to an exemplary embodiment. In operation 407, the setback control system 200 may store the selected time interval as EMS data.

Figure 5:
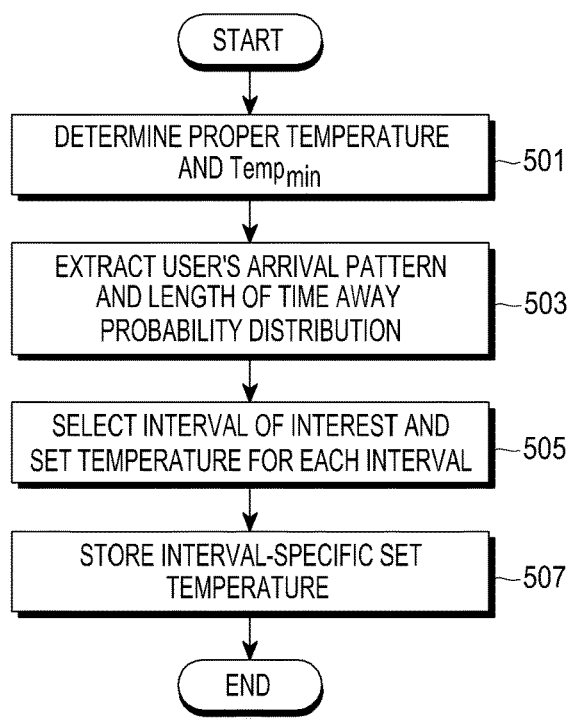
FIG. 5 illustrates a time interval-specific target temperature setting process for setback control according to an exemplary embodiment.

FIG. 5 illustrates a time interval-specific target temperature setting process for setback control according to an exemplary.

Referring to FIG. 5, in operation 501, based on the building data, the setback control system 200 may determine the desired temperature at which the user group having the similar characteristics may feel comfortable, and determine the room temperature $Temp_{min}$ that is maintained when the power of the heating/cooling appliance is turned off. Next, in operation 503, the setback control system 200 may determine the user's arrival pattern and the probability distribution of the length of time away based on the user pattern-based time interval probability distribution that is determined in operation 405 in FIG. 4. In operation 505, the setback control system 200 may select an interval of interest in which the setback control system 200 will perform setback control depending on the temperature values determined in operation 501 and the user's arrival pattern and the probability distribution of the going-out length, which are determined in operation 503, and set a target temperature for the selected time interval. In operation 507, the setback control system 200 may store the selected time interval-specific target temperature as EMS data.

Figure 6:
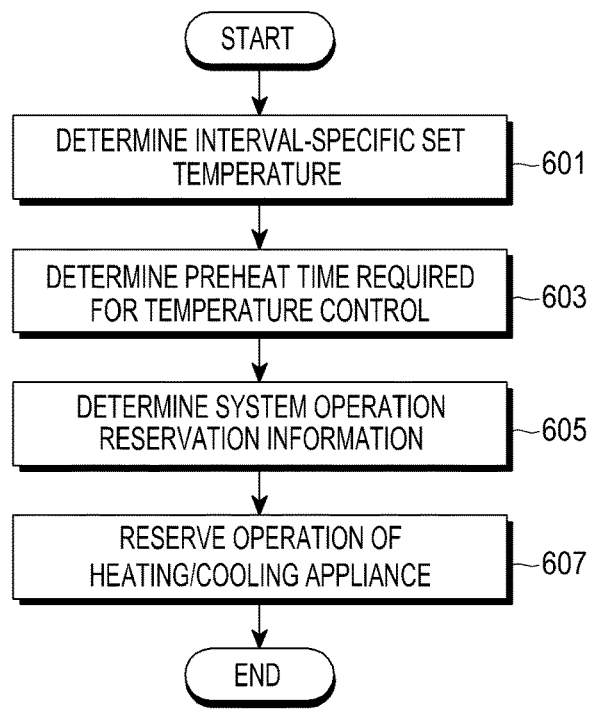
FIG. 6 illustrates a system operation reservation method for setback control according to an exemplary embodiment.

FIG. 6 illustrates a system operation reservation method for setback control according to an exemplary embodiment.

Referring to FIG. 6, the setback control system 200 may determine the time interval-specific target temperature that is set through the process in FIG. 5, in operation 601, and determine a preheat time for the target temperature based on the building data in operation 603. The preheat time is the time in which the heat transfer delay time of the system is reflected. In operation 605, the setback control system 200 may determine system operation reservation information based on the EMS data. In operation 607, the setback control system 200 may finally reserve the system operation for setback control based on the information that is determined in operations 601 to 603.

Figure 7:
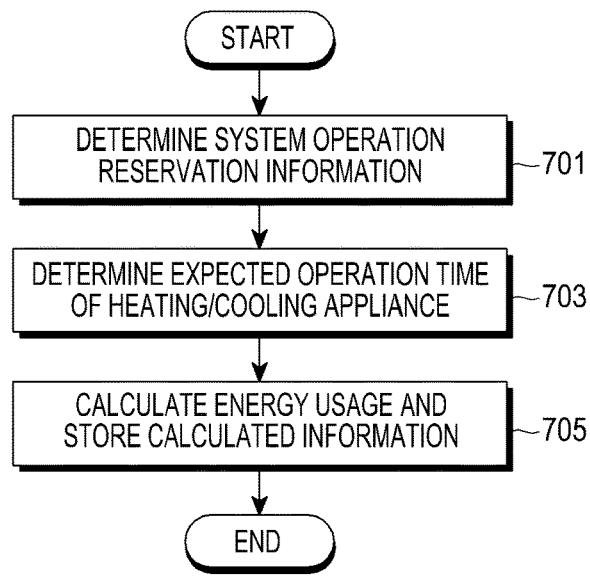
FIG. 7 illustrates an energy usage calculation method for setback control according to an exemplary embodiment.

FIG. 7 illustrates an energy usage calculation method for setback control according to an exemplary embodiment.

Referring to FIG. 7, the setback control system 200 may determine the system operation reservation information for a reservation in FIG. 6, in operation 701, and calculate a predicted operation time of the heating/cooling appliance based on the building data and the calculated preheat time in operation 703. In operation 705, based on the current time, the reservation information of the heating/cooling appliance and the expected operation time, the setback control system 200 may calculate the energy usage and store the calculated energy usage as EMS data. In addition, by comparing energy usage given when the setback control is used, with energy usage given when the setback control is not used, using the stored data, it is possible to efficiently save the energy.

The processes shown in FIGS. 3 to 7 do not need to be performed in sequence, and some processes may be subject to change in terms of the order within the range that does not affect the efficiency of the setback control.

As described above, the setback control method according to an exemplary embodiment may collect and group the data in which the domain characteristics of the building are taken into consideration, so the collected and grouped data may be used not only for setback control, but also for building management. In addition, it is possible to save energy by efficiently performing HVAC control using the hotel surrounding information, the other guests' real-time occupancy/absence pattern, and the lodging information-based guest arrival time prediction method and its information. Further, without considering a user's comeback time, like in the conventional manner, it is difficult to prevent energy inefficiency and user inconvenience problems, which may occur. Moreover, it is possible to perform setback in which the characteristics (e.g., the aging degree, the efficiency, the function and/or the like) of the HVAC system are taken into consideration, and by performing setback control using the user's arrival/departure pattern, it is possible to provide a high energy saving rate while further ensuring the user comfort. As a result, it is possible to efficiently operate the building through energy saving prediction.

While the present disclosure has been shown and described with reference to exemplary embodiments, it will be understood by those skilled in the art that various changes in form and details may be made therein without departing from the spirit and scope of the disclosure, as defined by the appended claims and their equivalents.

What is claimed is:

1. A method for controlling energy in a climate control system, the method comprising:
   determining whether a user is absent in a space for energy control;
   in response to the user being absent, determining whether to initiate energy control based on obtained data comprising user data, environmental data, building data, and energy control system data;
   in response to determining to initiate energy control, determining a departure probability of the user for each of a plurality of time intervals and determining a probability distribution for a length of time away of the user for the each of the plurality of time intervals, based on the obtained data;
   selecting a target time interval for performing energy control among the plurality of time intervals, based on an arrival probability of the user that is calculated based on the determined probability distribution, and calculating a target temperature for performing energy control for the selected target time interval; and
   performing energy control based on the selected target time interval and the calculated target temperature,
   wherein a length of the each of the plurality of time intervals is determined based on energy consumption corresponding to a temperature change.

2. The method of claim 1, wherein determining the probability distribution comprises:
   obtaining departure pattern information and arrival pattern information of a user group including users having similar characteristics to characteristics of the user, based on the obtained data; and
   determining the departure probability and the probability distribution, based on the obtained departure pattern information and the obtained arrival pattern information.

3. The method of claim 1, wherein the climate control system is a Heating, Ventilation, and Air Conditioning (HVAC) system, and
   wherein selecting the target time interval and calculating the target temperature comprises:
      determining a desired temperature of a user group including users having similar characteristics to characteristics of the user, and determining a room temperature that is maintained when power of the HVAC system is turned off;
      selecting the target time interval in which the arrival probability is higher than or equal to a predetermined threshold and energy control is to be performed; and
      calculating the target temperature for the selected target time interval based on the desired temperature and the room temperature.

4. The method of claim 1, wherein the climate control system is a Heating, Ventilation, and Air Conditioning (HVAC) system, and
   wherein the performing comprises:
      calculating a preheat time required for energy control based on characteristics of the HVAC system;
      determining operation reservation information for the HVAC system; and
      setting reservation based on the calculated preheat time and the determined operation reservation information.

5. The method of claim 1, wherein determining whether the user is absent comprises:
   determining whether the user is absent based on at least one of a state of a door lock, data that is output from at least one sensor, and a current state of at least one device that is located in the space and connected to a network or a gateway.

6. The method of claim 1, wherein the user data includes at least one of gender of the user, age of the user, purpose of travel, travel period, number of companions, and ages of the companions,
   wherein the environmental data includes at least one of date, day and weather,
   wherein the building data includes at least one of characteristics of an area where the building is located, information about a periphery of the building, data related to an event in a vicinity of the building, and a past or current user-specific occupancy pattern of the building, and
   wherein the energy control system data includes data related to previous energy control execution.

7. The method of claim 1, further comprising:
   upon determining to initiate energy control, determining whether pre-reserved information is present for energy control, and in response to the pre-reserved information being present, setting reservation for performing energy control based on the pre-reserved information,
   wherein the pre-reserved information comprises a time information for initiating energy control and the target temperature.

8. The method of claim 1, further comprising:
   calculating an amount of energy consumed based on scheduling information of the energy control, and calculating the amount of energy consumed when a room temperature of the space is maintained constant; and
   storing the calculated amount of energy consumed based on the scheduling information of the energy control and the calculated amount of energy consumed when a room temperature of the space is maintained constant, to use for future energy control.

9. An apparatus for controlling energy in a climate control system, the apparatus comprising:
   a storage configured to store obtained data comprising user data, environmental data, building data, and energy control system data;
   a temperature sensor configured to detect a room temperature of a space for energy control; and
   a temperature controller configured to:
      determine whether a user is absent in the space;
      in response to the user being absent, determine whether to initiate energy control based on the obtained data;
      in response to determining to initiate energy control, determine a departure probability of the user for each of a plurality of time intervals and determine a probability distribution for a length of time away of the user for the each of the plurality of time intervals, based on the obtained data;
      select a target time interval for performing energy control among the plurality of time intervals, based on an arrival probability that is calculated based on the determined probability distribution, and calculate a target temperature for performing energy control for the selected target time interval; and perform energy control based on the selected target time interval and the calculated target temperature, wherein a length of the each of the plurality of time intervals is determined based on energy consumption corresponding to a temperature change.

10. The apparatus of claim 9, wherein the temperature controller is configured to:

obtain departure pattern information and arrival pattern information of a user group including users having similar characteristics to the characteristics of the user, based on the obtained data; and determine the departure probability and the probability distribution, based on the obtained departure pattern information and the obtained arrival pattern information.

11. The apparatus of claim 9, wherein the climate control system is a Heating, Ventilation, and Air Conditioning (HVAC) system, and wherein the temperature controller is configured to:

determine a desired temperature of a user group including users having similar characteristics to characteristics of the user, and determine a room temperature that is maintained when power of the HVAC system is turned off;

select the target time interval in which the arrival probability is higher than or equal to a predetermined threshold and energy control is to be performed; and calculate the target temperature for the selected target time interval based on the desired temperature and the room temperature.

12. The apparatus of claim 9, wherein the climate control system is a Heating, Ventilation, and Air Conditioning (HVAC) system, and wherein the temperature controller is configured to:

calculate a preheat time required for energy control based on characteristics of the HVAC system;

determine operation reservation information for the HVAC system; and set reservation based on the calculated preheat time and the determined operation reservation information.

13. The apparatus of claim 9, wherein the temperature sensor is configured to determine whether the user is absent based on at least one of a state of a door lock, data that is output from at least one sensor, and a current state of at least one device that is located in the space and connected to a network or a gateway.

14. The apparatus of claim 9, wherein the user data includes at least one of gender of the user, age of the user, purpose of travel, travel period, a number of companions, and ages of the companions, wherein the environmental data includes at least one of date, day and weather, wherein the building data includes at least one of characteristics of an area where the building is located, information about a periphery of the building, data related to an event in a vicinity of the building, and a past or current user-specific occupancy pattern of the building, and wherein the energy control system data includes data related to previous energy control execution.

15. The apparatus of claim 9, wherein the temperature controller is configured to:

upon determining to initiate energy control, determine whether pre-reserved information is present for energy control, and in response to the pre-reserved information being present, set a reservation for performing energy control based on the pre-reserved information, wherein the pre-reserved information comprises a time information for initiating energy control and the target temperature.

16. The apparatus of claim 9, wherein the temperature controller is configured to:

calculate an amount of energy consumed based on scheduling information of the energy control, and calculate the amount of energy consumed when a room temperature of the space is maintained constant; and store the calculated amount of energy consumed based on the scheduling information of the energy control and the calculated amount of energy consumed when a room temperature of the space is maintained constant, to use for future energy control.

17. A method of controlling a climate in a room, the method comprising:

determining whether a user is present in the room; and in response to the user being not present in the room for a period of time, initiating a temperature control sequence, wherein the temperature control sequence comprises:

collecting information about departure habits of the user and arrival habits of the user;

determining an arrival probability of the user in each of a plurality of time intervals based on the departure habits of the user and arrival habits of the user;

determining an arrival probability of the user in a current time interval by comparing the current time interval to each of the plurality of time intervals; and adjusting a temperature of the room according to the determined arrival probability, wherein a length of the each of the plurality of time intervals is determined based on energy consumption corresponding to a temperature change.

18. The method of claim 17, wherein the determining whether the user is present in the room comprises at least one of detecting a card key in a lock and detecting motion using a motion sensor.

* * * * *